United States Patent
Sukumaran et al.

(10) Patent No.: US 8,589,898 B2
(45) Date of Patent: *Nov. 19, 2013

(54) METHOD AND APPARATUS FOR ANALYZING SOFTWARE INCLUDING A CALIBRATED VALUE

(75) Inventors: Srihari Sukumaran, Karnataka (IN); Ramesh Sethu, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 848 days.

This patent is subject to a terminal disclaimer.

(21) Appl. No.: 12/748,525

(22) Filed: Mar. 29, 2010

(65) Prior Publication Data

US 2011/0239203 A1   Sep. 29, 2011

(51) Int. Cl.
  *G06F 9/44*   (2006.01)
  *G06F 9/45*   (2006.01)

(52) U.S. Cl.
  USPC ............ 717/144; 717/106; 717/111; 717/133

(58) Field of Classification Search
  USPC .................................................. 717/100–145
  See application file for complete search history.

(56) References Cited

U.S. PATENT DOCUMENTS

| | | | |
|---|---|---|---|
| 5,161,216 A | 11/1992 | Reps et al. | |
| 7,302,707 B1 | 11/2007 | Weber et al. | |
| 7,620,946 B2 | 11/2009 | Russell | |
| 2007/0214391 A1 | 9/2007 | Castro et al. | |
| 2010/0083240 A1* | 4/2010 | Siman | 717/144 |

OTHER PUBLICATIONS

Ou, Jen-Chieh; Hardware Description Language Program Slicing and way to Reduce Bounded Model Checking Search Overhead; Ph.D. Thesis; 2007 Case Western Reserve University.

* cited by examiner

*Primary Examiner* — Chuck Kendall

(57) ABSTRACT

A computer-implemented method for evaluating a machine-executable software code specification includes using the computer to generate a system dependence graph corresponding to the software code specification. The system dependence graph includes elements including nodes and edges. The computer evaluates the system dependence graph including selecting a variable modified in the software code specification, providing a control operation node of the system dependence graph corresponding to a control statement in the software code specification with a preferred calibration state, traversing to selected elements of the system dependence graph wherein the selected elements are associated with the selected variable and the preferred calibration state of the control operation node, evaluating only the selected elements of the system dependence graph, and identifying ones of the selected elements whereat a state of the selected variable is modified.

20 Claims, 9 Drawing Sheets

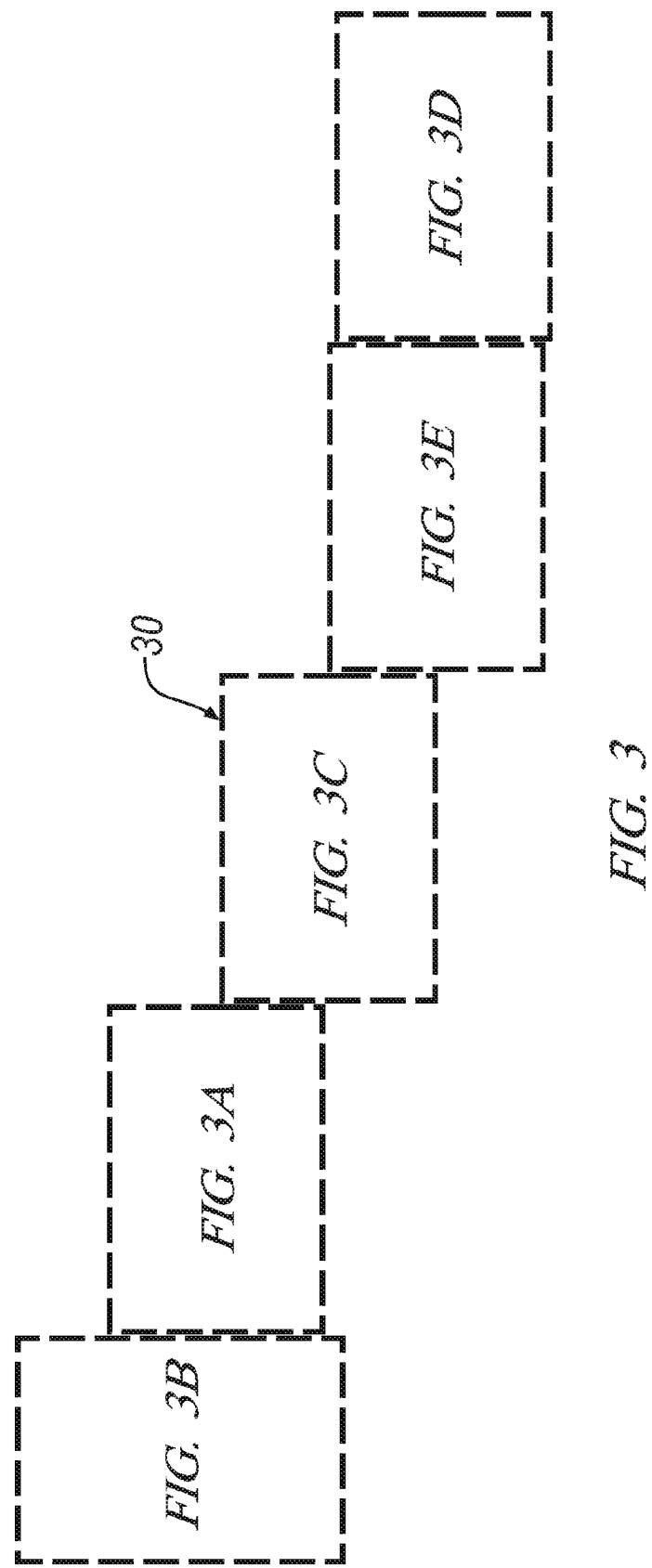

METHOD AND APPARATUS FOR ANALYZING SOFTWARE INCLUDING A CALIBRATED VALUE

TECHNICAL FIELD

This disclosure relates to design automation for embedded system design and particularly to structural analysis of software programming code specifications using a computer.

BACKGROUND

The statements in this section merely provide background information related to the present disclosure and may not constitute prior art.

Known control systems include embedded systems that have control modules configured to execute embedded software programs to accomplish one or more prescribed functions. The control module and embedded software program can be concurrently designed and developed, often referred to as a codesign process. The control module can include a programmable processing device, including one of an application-specific integrated circuit (ASIC), an electronic circuit, and a central processing unit, e.g., a microprocessor. The programmable processing device includes or is signally and operatively connected to memory and storage devices. Exemplary memory and storage devices include, e.g., read only memory (ROM), programmable read only memory (PROM), random access memory (RAM), and hard drives. The programmable processing device is configured to execute one or more embedded software or firmware programs. The control module may include combinational logic circuit(s), input/output circuit(s) and device(s) that signally and operatively connect to the processor. The control module includes appropriate signal conditioning and buffer circuitry and other suitable components to accomplish the prescribed function.

Embedded software can be developed and specified using a programming language that can be compiled into machine code suitable for storing and execution by the programmable processing device of the control module. A known software analysis method includes program slicing to identify a subset of program statements that may affect computation at a particular point in a program. This program point, which may be defined as a statement or a particular variable used at a statement, is called the slicing criterion. In the simple case of a single entry, single-exit program, a slice is determined by finding all the transitive data flow and control dependences that lead to the slicing criterion. Slicing is useful as a maintenance or reuse tool for activities such as program understanding, debugging, regression testing, and function extraction from existing code. As an interactive tool, a program slicer facilitates understanding of relevant portions of the software by directly transforming the source code into a simplified specification.

A program slice consists of those statements that may affect the values of criterion variables, including whether or not the statement executes. One known slice is computed by iteratively solving data and control flow equations based on a control flow graph representation of a software program.

A control flow graph is a representation of a program suitable for systematic analysis, derived from an imperative language source code specification using standard techniques. A control flow graph includes operations, referred to as nodes, and control and data paths between operations, referred to as edges. A flow graph is an equivalent representation that consists of basic procedures and control paths between the basic procedures. A basic procedure is a sequence of operations that always execute as a group. A control flow graph is a common representation for source code analysis, and standard techniques exist to find control dependence relationships and data flow dependence relationships.

In a control flow graph-based approach, a system dependence graph summarizes control and data dependences of an entire program or portion thereof. A system dependence graph is composed of one or more procedure dependence graphs, where each procedure dependence graph summarizes intra-procedure control and data flow dependences. The procedure dependence graphs, one for each procedure in the program, are connected in the system dependence graph with edges that indicate inter-procedure data and control dependences. A graph-based approach allows a more precise calculation of a slice and includes fewer statements. A threaded control flow graph can be defined such that all parallel threads are explicitly indicated in a single control flow graph, which is then analyzed to find interference dependences, which are data flow dependences between parallel software threads, as well as feasible execution order for the multiple software threads.

SUMMARY

A computer-implemented method for evaluating a machine-executable software code specification includes using the computer to generate a system dependence graph corresponding to the software code specification. The system dependence graph includes elements including nodes and edges. The computer evaluates the system dependence graph including selecting a variable modified in the software code specification, providing a control operation node of the system dependence graph corresponding to a control statement in the software code specification with a preferred calibration state, traversing to selected elements of the system dependence graph wherein the selected elements are associated with the selected variable and the preferred calibration state of the control operation node, evaluating only the selected elements of the system dependence graph, and identifying ones of the selected elements whereat a state of the selected variable is modified.

BRIEF DESCRIPTION OF THE DRAWINGS

One or more embodiments will now be described, by way of example, with reference to the accompanying drawings, in which:

FIG. 3 schematically shows a system dependence graph that has been generated for software code to achieve a prescribed function in accordance with the present disclosure;

DETAILED DESCRIPTION

Figure 1:
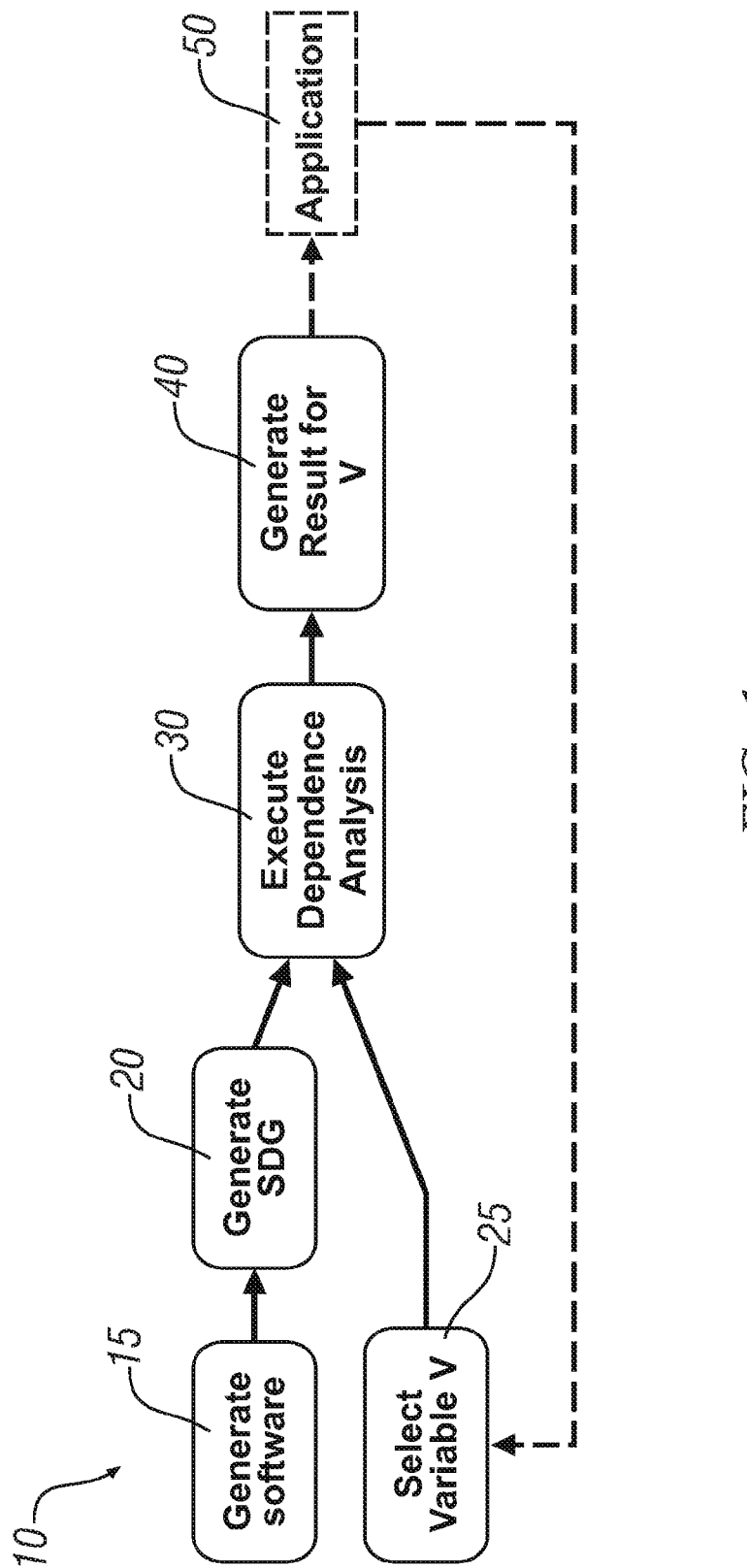
FIG. 1 schematically shows a process for evaluating a specification for software code, wherein the software code is executable to achieve a prescribed function in accordance with the present disclosure.

Referring now to the drawings, wherein the showings are for the purpose of illustrating certain exemplary embodiments only and not for the purpose of limiting the same, FIG. 1 schematically depicts a process 10 for evaluating a specification for software code, wherein the software code is executable in a programmed control module to achieve a prescribed function.

A programmer uses a computer to generate a software code specification that is compiled into machine-executable code that is stored and executed in a control module to achieve a predetermined function (15). As is appreciated, the software code specification is generated using a programming language. One known programming language is C. Others are known to persons having ordinary skill in the art. Exemplary software code is shown with reference to Table 1 hereinbelow. A control module means any suitable combination of one or more application-specific integrated circuit(s), electronic circuit(s), central processing unit(s) (e.g., microprocessor(s)) and associated memory and storage devices (e.g., read only, programmable read only, random access, hard drive) configured to execute the software code, combinational logic circuit(s), input/output circuit(s) and devices, appropriate signal conditioning and buffer circuitry, and other suitable components to provide the described functionality. The computer is programmed to implement the following processes to evaluate the software code specification. This includes executing a dependence analysis to identify all data entities that directly or indirectly affect the state or value of a selected variable and identify code paths by which the effects are made manifest, thus assisting the programmer in evaluating the software code specification.

A system dependence graph (hereafter SDG) is generated for the software code specification to achieve the prescribed function (20). The SDG may include one or more procedure dependence graphs (hereafter PDG). An exemplary SDG is shown with reference to FIG. 3. A PDG is a graphical representation of a software code specification that is suitable for systematic analysis, and can be derived from an imperative language source code specification using known techniques. The PDG is constructed from elements that are one of operations, i.e., nodes, and control paths between the operations, i.e., edges. The PDG is an equivalent representation that includes nodes that are connected via edges. As is appreciated, a node depicts or is representative of a computation, i.e., an expression or statement represented in a line of a software code specification, and can include an actual operation or a formal operation. By way of example, types of nodes can include a data node, a formal node, a called-procedure node, an entry node, an exit node. One specific type of node is a control operation node, also referred to as a control point, which is associated with a line of software code that is a control statement, e.g., where a decision is made. One control statement is in the form of an if/then/else statement. Another control statement is in the form of a switch/case. As is appreciated, there are other forms of control statements and associated control operation nodes. An edge depicts a control or data dependence between selected edges and is directional, with the direction indicated by an arrow.

The SDG includes one or a plurality of PDGs that function as basic procedures in a sequence of operations that execute as a group. An edge is either one of a data edge (Data) for communicating data for data-related dependences and a control edge (Control) for communicating a control signal for control-related dependences. An edge can also include an intra-procedural edge and an inter-procedural edge. A PDG is a known tool useable for analyzing software code specification that includes known techniques to identify control dependence relationships and data flow dependence relationships. Exemplary PDGs associated with the SDG of FIG. 3 are shown with reference to FIGS. 3A, 3B, 3C, 3D, and 3E.

The software code specification includes one or more variables. Each variable is an element that is named using a character string. Each variable is defined as one of a character, an integer, and a floating point decimal, i.e., a real number, among others. Each variable is one of a local variable and a global variable. A local variable is a variable that is only accessed and used within a procedure, i.e., an operation defined by a single PDG. Thus, the state of the local variable can only be modified within the procedure. A global variable is a variable that is used by multiple basic procedures, i.e., multiple operations and those defined by multiple PDGs. Thus, the state of the global variable can be modified in each of the multiple basic procedures.

One of the variables V associated with the SDG is selected for analysis (25). A dependence analysis is executed using the selected variable V as the basis for traversing selected elements of the SDG (30). This is described in detail with reference to FIG. 2. Executing the dependence analysis identifies all of the data entities that directly or indirectly affect the state or value of the selected variable V. The dependence analysis further identifies code paths by which the effects are made manifest.

The dependence analysis identifies all of the elements, i.e., nodes and edges that affect the value of the selected variable V by traversing the selected elements of the SDG using the selected variable V.

Results associated with using the dependence analysis to traverse through the selected elements of the SDG using the selected variable V are generated and stored (40). The results are made available to a practitioner via an application program (Application) and include identification of all elements in the SDG that directly or indirectly affect the state or value of the selected variable V (50). Affecting the state or value of the selected variable V may include modifying the selected variable V, modifying a variable that is related to the selected variable V, and using the related variable. Illustrative results associated with traversing through selected elements of an SDG using a selected variable V are shown with reference to FIG. 4.

Figure 2:
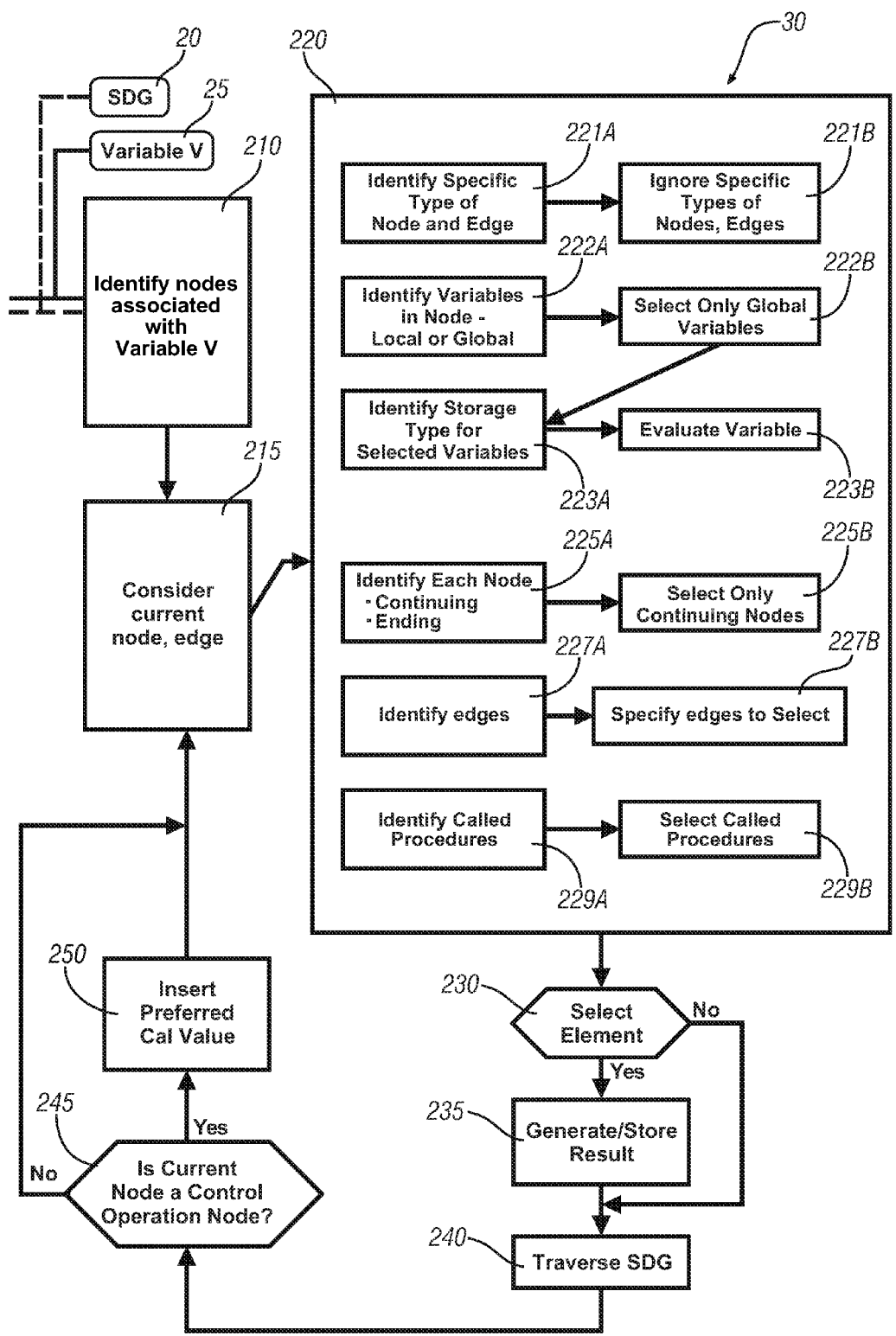
FIG. 2 schematically shows a process of traversing selected elements of a system dependence graph using a selected variable V to execute a dependence analysis in accordance with the present disclosure.

FIG. 2 shows the process of traversing the selected elements of the SDG using the selected variable V to execute a dependence analysis. Traversing is meant to be descriptive of the process of tracing the selected variable V from a starting point, e.g., whereat the selected variable V is modified, and working in a backwards or reverse analysis fashion following the edges until arriving at an initial point. Traversing selected elements of the SDG includes tracing the selected variable V from its starting point and working in a backwards or reverse analysis fashion following selected nodes and selected edges until arriving at the initial point.

The node whereat the selected variable V is modified is identified and selected as a starting point on the SDG for the selected variable V (210).

A current element, i.e., a current node and an associated edge(s) are considered for analysis (215). Initially, the current element is the node whereat the selected variable V is modified, and the associated edge(s) includes any edge that leads to the current node. During subsequent iterations, the current element is another element of the SDG determined by tracing the selected variable V from its starting point and working in a backwards or reverse analysis fashion following selected nodes and selected edges until arriving at the initial point.

A dependence analysis is executed to evaluate the current element using predetermined criteria associated with the selected variable V (220). When the evaluation indicates that the current element is consistent with the predetermined criteria, the current element is selected (230). Results associated with traversing to the current element of the SDG are generated and stored (235). The stored results identify or otherwise indicate whether the selected variable V or a related variable has been modified or accessed at the current element of the SDG. When the current element is not selected, or when the results associated with traversing the selected element of the SDG using the selected variable V are generated and stored, the process traverses to a subsequent element associated with the selected variable V with the current node updated to the subsequent element (240).

The updated current node is evaluated to determine whether it is a control operation node, including a control operation node that includes a calibration (245). Under such conditions, a selected or preferred calibration value is inserted into the control operation node (250). Thus, the controlling expression at the subject control operation node or control-point is checked to determine which branch(es), i.e., edge(s) from the control operation node, is feasible with the preferred calibration value inserted therein. Any non-feasible branch(es) is not selected. This selection is similar to identifying and selecting a specific type of each node and edge (221A) and ignoring or not considering other specific types of nodes and associated edges (221B) using a check on the controlling condition at the control-point node with a preferred calibration value. Thus, a control operation node of the system dependence graph corresponding to a control statement in the software code specification can be provided with a preferred calibration state as part of the analysis. The updated current element associated with the selected variable V is considered for analysis (215) including being exposed to the dependence analysis (230) described herein.

It is appreciated that traversing to a subsequent element associated with the selected variable V can include selecting a contiguous edge associated with a node, including instances when the previously evaluated edge is not evaluated. It is appreciated that traversing the SDG to a subsequent element associated with the selected variable V can include selecting a subsequent node connected to an evaluated edge when the previously evaluated edge is evaluated, including using any control operation node that includes a selected or preferred calibration value as a basis for subsequent traversal of the SDG. The process is preferably repeated until all selectable elements determined using the predetermined criteria set forth in the dependence analysis (220) and associated with the selected variable V in the SDG are evaluated.

The dependence analysis (220) is executed to evaluate each current element of the SDG associated with the selected variable V using predetermined criteria. Specific elements, i.e., nodes and edges of the SDG associated with the selected variable V are selected, ignored, or passed over. This includes ignoring or otherwise not considering specific types of nodes and associated edges, selecting specific types of edges to traverse, selecting or otherwise deciding whether to select a node that steps into a called procedure or summarize the called procedure associated with the node. This also includes deciding on local traversal strategies and making output decisions based on specific variable storage types.

Evaluating the current element of the SDG using predetermined criteria (220) includes identifying and selecting a specific type of each node and edge (221A) and ignoring or not considering other specific types of nodes and associated edges (221B). Ignored nodes may include, by way of example, a node including a scheduler. It is appreciated that other nodes may be ignored.

Evaluating the current element of the SDG using predetermined criteria (220) includes identifying each node as one of a continuing node and an end node (225A), and only selecting the continuing node while ignoring the end node and associated edges leading thereto (225B). An end node is defined as a node having an edge(s) leading into it, with no edge leading out of it. A continuing node is defined as a node having edges leading into and out of it. One specific kind of continuing node is a software code having decision making capability, e.g., using if/then/else branches.

Evaluating the current element of the SDG using predetermined criteria (220) includes identifying variables used in a node as one of a global variable and a local variable (222A). Elements that are nodes that use a global variable are selected, and elements that are nodes that use a local variable are passed over, i.e., the element is not evaluated (222B). However, when the element is a node that uses a local variable, the selective traversal process will traverse to the unselected node and proceed therefrom by executing the dependence analysis on the edges connected thereto. When the element is a node that uses a global variable, the current element is defined as one of a character, an integer, and a floating point decimal (223A), and is evaluated as such (223B). Evaluating the current element of the SDG using predetermined criteria also includes identifying domain-specific variable memory storage types, including calibrations, volatile memory locations, local memory locations, and non-volatile memory locations and types associated with the variable V.

Evaluating the current element of the SDG using predetermined criteria (220) includes identifying each edge as a specific type of edge (227A) and selecting specific types of edges to traverse, and correspondingly choosing specific types of edges to ignore or not traverse (227B). As previously stated, an edge is either one of a data edge for communicating a data signal and a control edge for communicating a control signal. An edge can also include an intra-procedural edge and an inter-procedural edge. Thus, selecting specific types of edges to traverse may include selecting only data edges, selecting only control edges, or selecting both data and control edges. Furthermore, selecting specific types of edges to traverse may include ignoring only data edges and selecting only control edges for both intra-procedural edges and inter-procedural edges. A skilled practitioner can conceive of other edge-traversing combinations involving the intra-procedural edges and inter-procedural edges.

Evaluating the current element of the SDG using predetermined criteria (220) includes identifying called procedures associated with a node (229A) and selecting only those nodes wherein the called procedure affects the identified variable associated with the current node, i.e., when the variable is identified as a global variable (229B). Those nodes wherein the called procedure affects the identified variable associated with the current node include those nodes where identified variable associated with the current node is a global variable, previously identified (222A).

The operation described with reference to FIGS. 1 and 2 is depicted in detail with reference to a software code specification shown as the following software program listing in Table 1 and associated SDG shown with reference to FIG. 3. Line numbers associated with each line of the software program listing are included, and are referenced in FIG. 4. The software program listing in Table 1 is illustrative of the disclosure.

TABLE 1

| Line | Software Program |
| --- | --- |
|  | proc.c |
| 2 | float Ve_f_dat1; |
| 3 | float Be_f_dat2; |
| 4 |  |
| 5 | short Ke_b_cal1 |
| 6 | /* @Ke_b_cal1 */ |
| 7, 8 | /* value will be inserted here */; |
| 9 |  |
| 10 | extern float read_sensor( ); |
| 11 |  |
| 12 | void func1( ) |
| 13 | { |
| 14 | float Le_f_var2; |
| 15 | Le_f_var2 = read_sensor( ); |
| 16 | if (Ke_b_cal1 != 0) |
| 17 | Be_f_dat2 = Le_f_var2 + Be_f_dat2; |
| 18 | Else |
| 19, 20 | Be_f_dat2 = Le_f_var2;           } |
| 21 | void func2( ) |
| 22 | float func2(int Lp_i_par1) |
| 23 | { |
| 24, 25 | return (Lp_i_par1 > 10)? Be_f_dat2 * 12.3 : Be_f_dat2;} |
| 26 |  |
| 27 | void proc2( ) |
| 28 | { |
| 29 | int Le_i_var1; |
| 30 | Le_i_var1 = 8; |
| 31 | func1( ); |
| 32, 33 | Ve_f_dat1 = func2(Le_i_var1);           } |
| 34 |  |
| 35 | void proc1( ) |
| 36 | { |
| 37, 38 | Be_f_dat2 = read_sensor( );           } |
| 39 |  |
| 40 | int main( ) |
| 41 | { |
| 42 | /* scheduling the different top-level procs. |
| 43 | * iterate through a |
| 44 | * list of function pointers */ |
| 45 | proc1( ); |
| 46, 47 | proc2( );           } |

FIG. 3 shows a SDG 300 corresponding to the software program listing of Table 1. As is appreciated, the SDG 300 can be generated subsequent to drafting and compiling the software program listing of Table 1. The SDG 300 includes a plurality of PDGs having control dependence relationships and data flow dependence relationships shown with reference to FIGS. 3A, 3B, 3C, 3D, and 3E. Each node is depicted as an oval-shaped element. Each edge is depicted as a directional line, with control and data edges shown. The control and data edges include intra-procedural edges and inter-procedural edges.

Figure 3A:
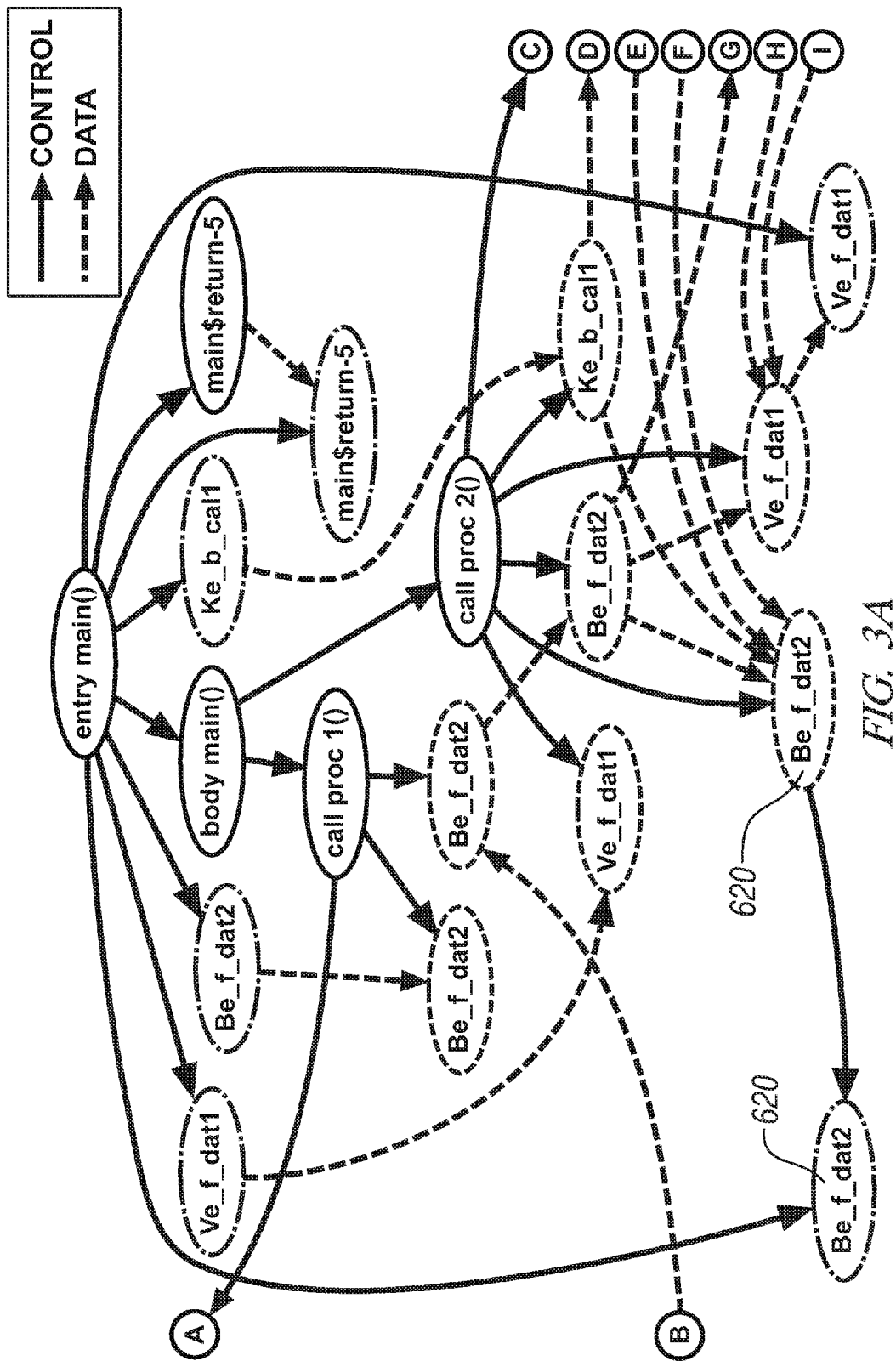
FIG. 3A shows a portion of the system dependence graph shown with reference to FIG. 3 and associated with a main portion of the software in accordance with the present disclosure.
Figure 3B:
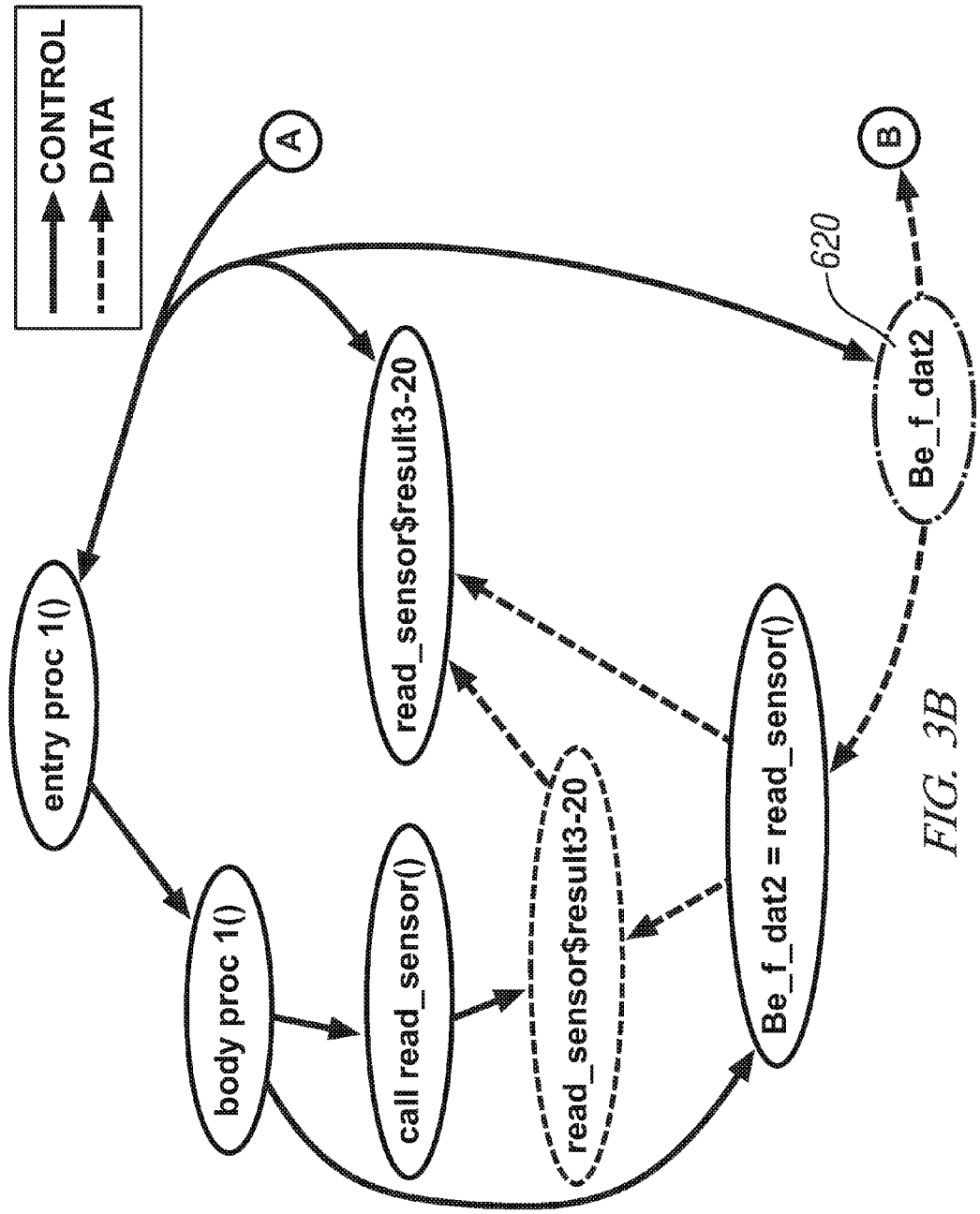
FIG. 3B shows a portion of the system dependence graph shown with reference to FIG. 3 and associated with a first procedure portion of the software in accordance with the present disclosure.
Figure 3C:
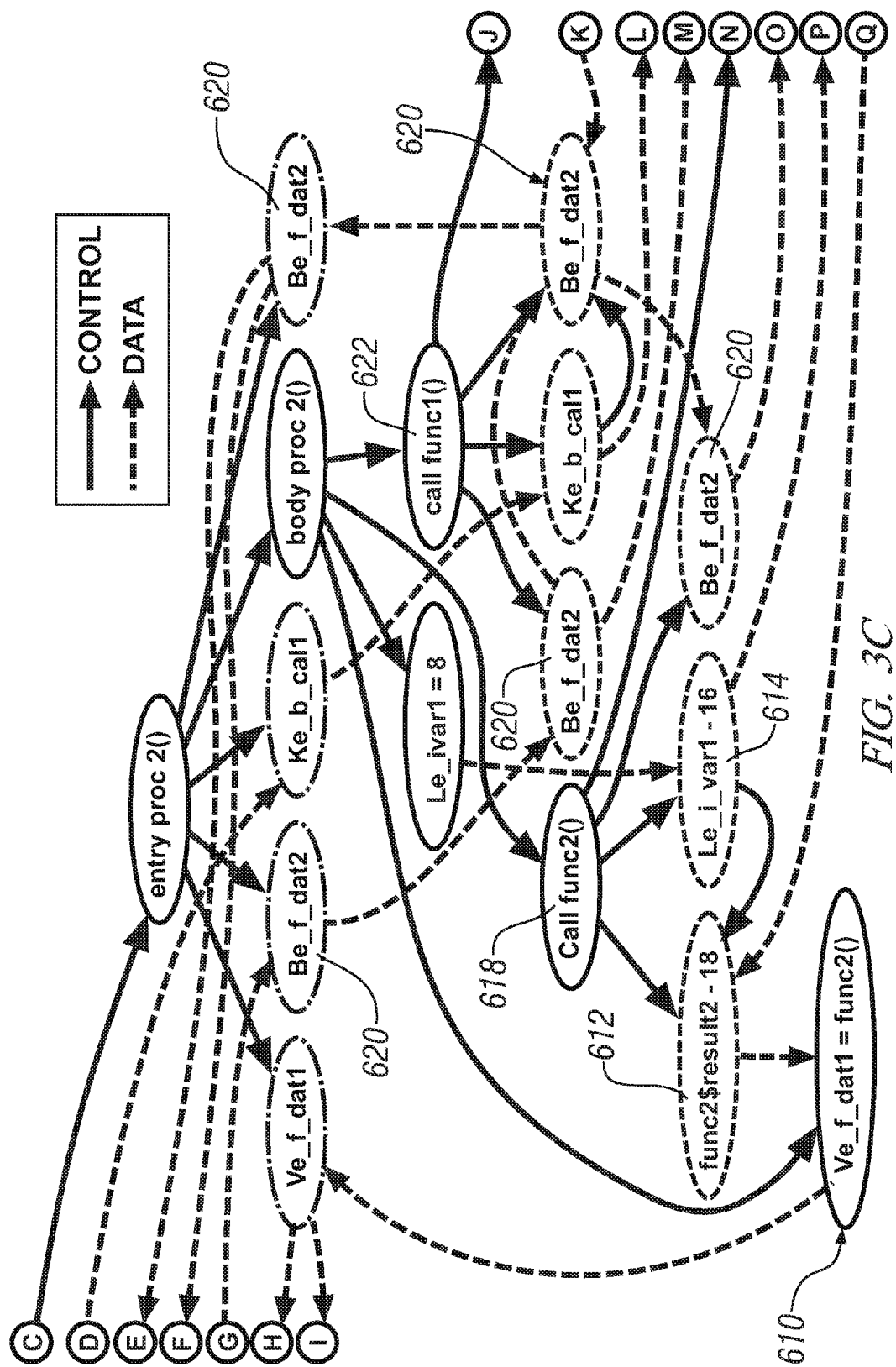
FIG. 3C shows a portion of the system dependence graph shown with reference to FIG. 3 and associated with a second procedure portion of the software in accordance with the present disclosure.
Figure 3D:
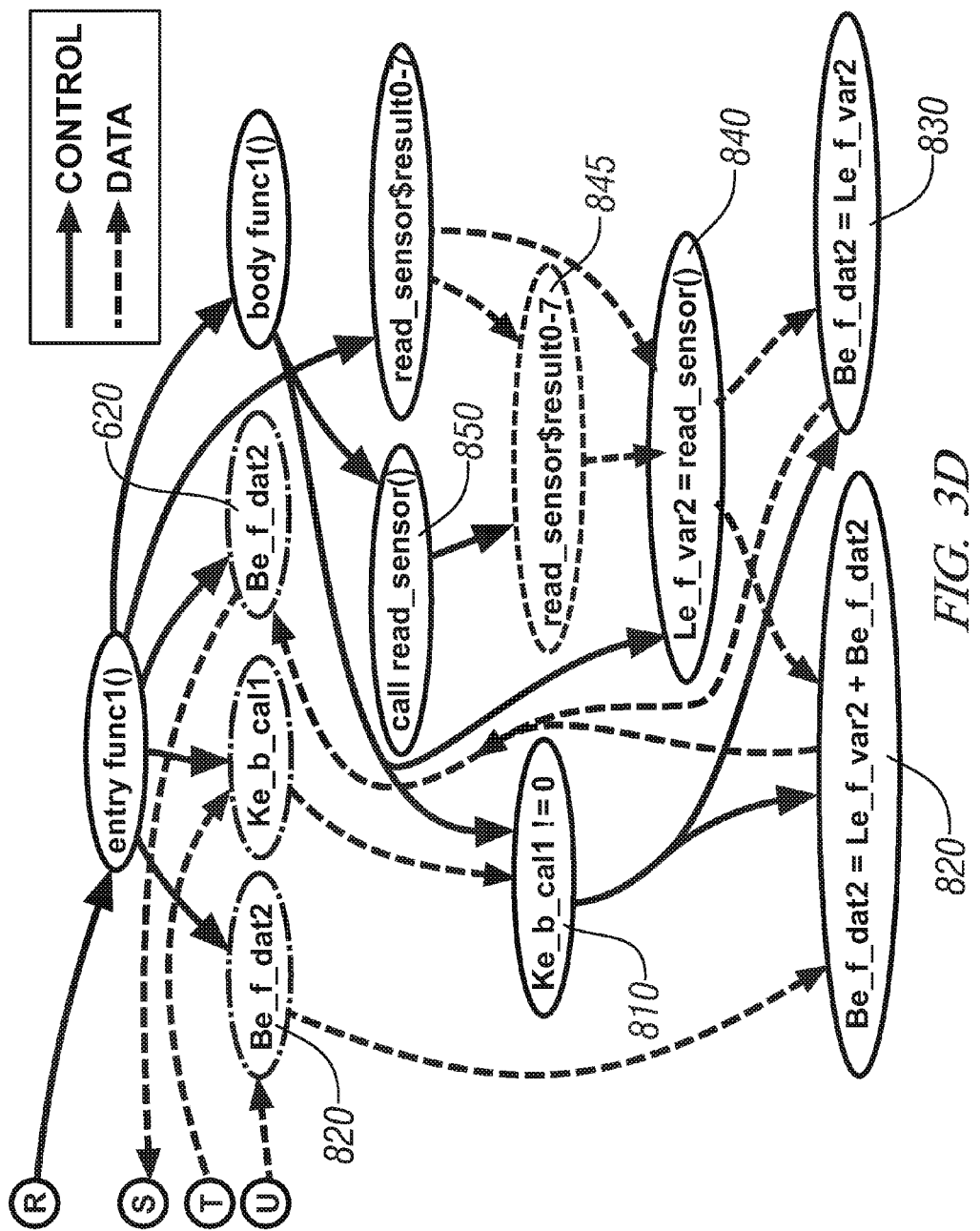
FIG. 3D shows a portion of the system dependence graph shown with reference to FIG. 3 and associated with a first function portion of the software in accordance with the present disclosure.
Figure 3E:
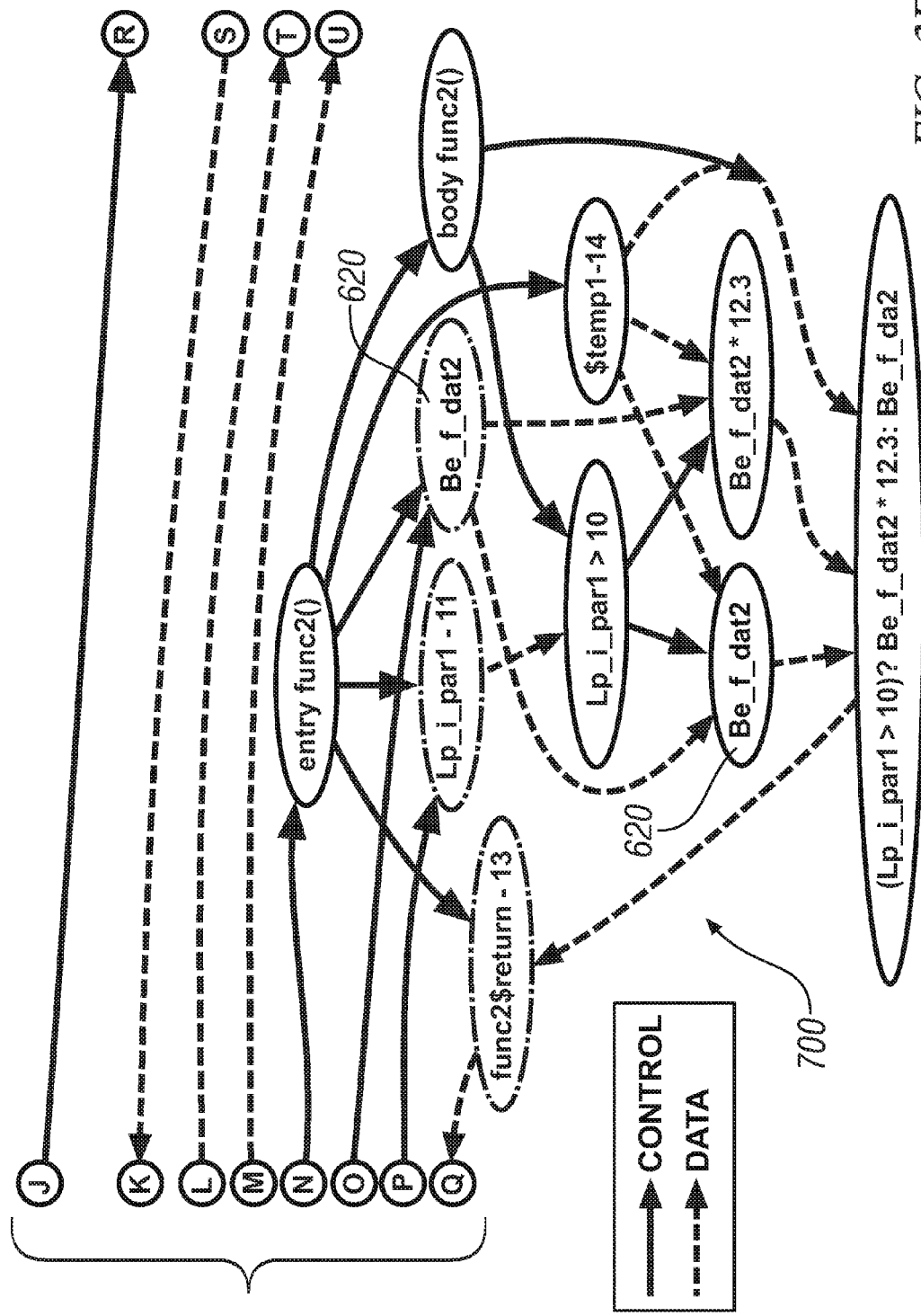
FIG. 3E shows a portion of the system dependence graph shown with reference to FIG. 3 and associated with a second function portion of the software in accordance with the present disclosure.

FIG. 3A shows a portion of the SDG 300 corresponding to a main portion of the software [entry main( )], depicted as "int main( )" and beginning at Line 40 in Table 1. FIG. 3B shows a portion of the SDG 300 associated with a first procedure portion of the software [entry proc1( )], depicted as "void proc1( )" and beginning at Line 35 in Table 1. FIG. 3C shows a portion of the SDG 300 corresponding to a second procedure portion of the software [entry proc2( )], depicted as "void proc2( )" and beginning at Line 27 in Table 1. FIG. 3D shows a portion of the SDG 300 corresponding to a first function portion of the software [entry func1( )], depicted as "void func1( )" and beginning at Line 12 in Table 1. FIG. 3E shows a portion of the SDG 300 corresponding to a second function portion of the software [entry func2( )], depicted as "void func2( )" and beginning at Line 21 in Table 1. Individual elements depicted in FIGS. 3A-3E are described in FIG. 4.

Figure 4:
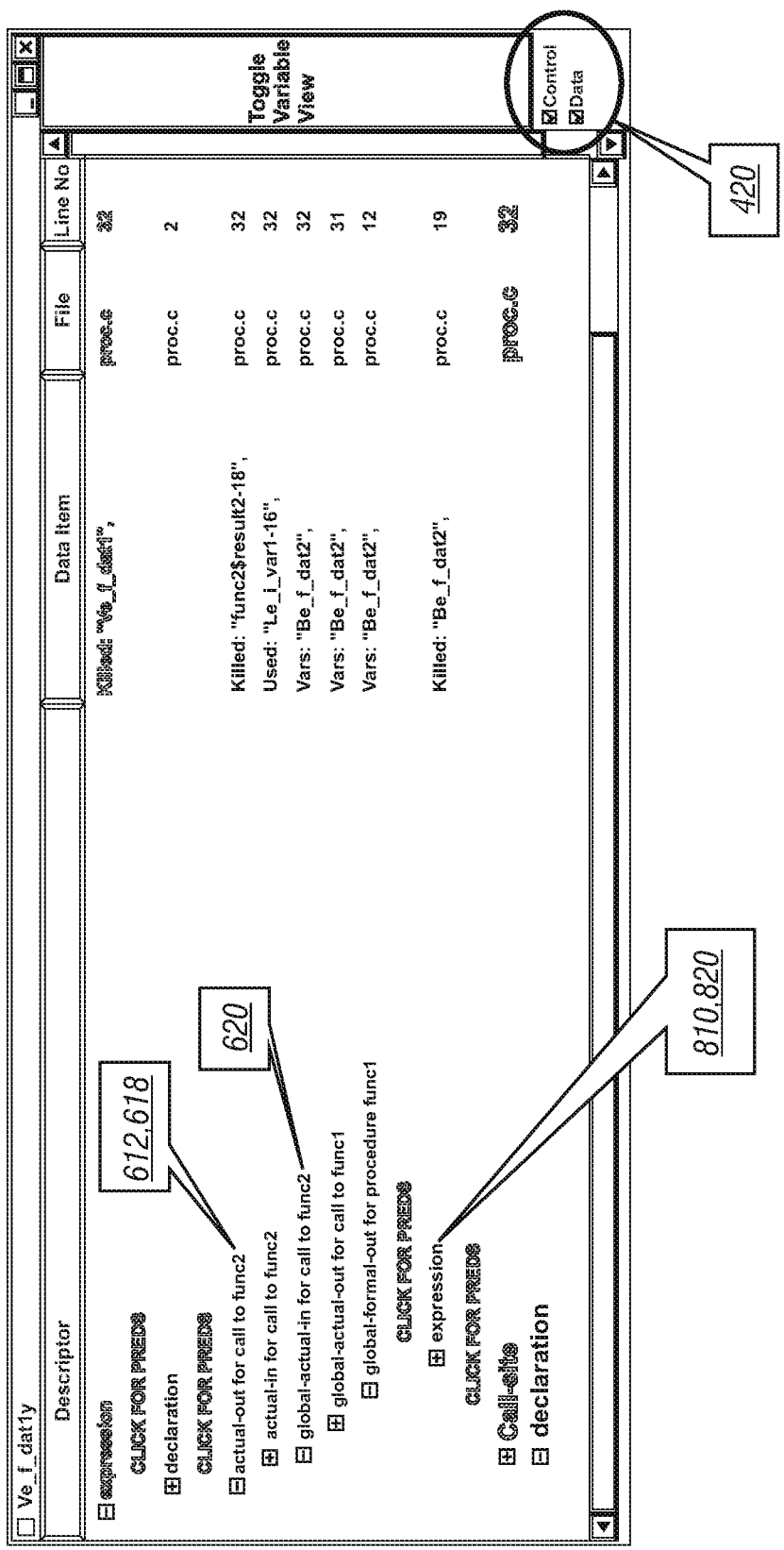
FIG. 4 is a diagram of an exemplary screen display including an output corresponding to a traversal through selected elements of software code using an associated system dependence graph shown in FIG. 3 in accordance with the present disclosure.

FIG. 4 is a diagram of an exemplary screen display illustrating results associated with traversing through selected elements of a SDG using a selected variable V, shown with reference to the software code of Table 1 using the associated SDG shown with reference to FIG. 3. It is appreciated that FIG. 4 illustrates the concepts described herein, and is not intended to be restrictive. The screen display indicates results associated with use of the aforementioned dependence analysis described hereinabove with reference to element 220 of FIG. 2 to evaluate a selected variable V, which is variable Ve_f_dat1 as shown. The dependence analysis is used to traverse selected elements of the system dependence graph associated with the selected variable, and includes traversing through the software code of Table 1 which has been used to generate the associated SDG shown with reference to FIG. 3. Referenced items in FIG. 4 include a descriptor (Descriptor) for each SDG node and related elements that are encountered during the selection and traversal data items referred to at the encountered SDG nodes, a data output (Data Item), the corresponding file name for the data output (File), and the associated line of software code (Line No.), shown in Col. 1 of Table 1, above.

The data output (Data Item) provides a designation to describe when a state of the selected variable V or a related variable has been changed or modified during an operation using a designator of "Killed." By way of example, the top line of the data output includes a data item identified as Killed: "Ve_f_dat1", which designates that the variable Ve_f_dat1 has been changed as a result of executing the procedure at Line 32 of the code shown in Table 1.

The data output (Data Item) provides a designation to describe when the selected variable V or a related variable has been used during an operation using designators of "Used" and "Vars." By way of example, a subsequent line of the data output includes a data item identified as Used: "Le_i_var1-16", which indicates that related variable Le_i_var1-16 has been used but not changed as a result of executing the procedure at Line 32 of the code shown in Table 1.

A part of setup for the evaluation includes providing a control operation node of the system dependence graph corresponding to a control statement in the software code specification with a preferred calibration state. In the embodiment described, the control operation node is element 810 on FIG. 3D, and it is provided with a calibration value of 0 for the evaluation.

Evaluation of the variable Ve_f_dat1 is initiated at a point whereat it is modified, shown as element 610 on FIG. 3C. The dependence analysis shown as element 220 in FIG. 2 is used to evaluate each current element of the SDG using predetermined criteria. The evaluation of a current element of the SDG using predetermined criteria includes traversing selected elements of the system dependence graph associated with the selected variable, and designating each traversed element associated with the selected variable V as selected, ignored, or passed over.

As shown, the selection analysis process traverses from element 610 to element 612 and then to element 618, which indicates a call to a first function (func2). The called function (func2) is depicted in detail as element 700 in FIG. 3D. The called function (func2) 700 is not entered, i.e., is passed over, but a return value for variable Be_f_dat2 is used, which is captured as Vars: "Be_f_dat2". This decision not to enter the called function (func2) 700 is made because the called function (func2) 700 does not modify or use the selected variable, i.e., Ve_f_dat1 or a related variable associated with the current node, as described with reference to executing one portion (229A, 229B) of the dependence analysis (220) described with reference to FIG. 2.

As shown, the selection analysis process also traverses from element 612 through element 620 to element 622, which indicates a call to a second function (func1). The called function (func1) is depicted in detail as element 800 in FIG. 3E. The called function (func1) 800 is entered, i.e., is selected and traversed. This decision is made because the called function (func1) 800 uses a global variable that modifies the related variable Be_f_dat2, as described with reference to executing one portion (222A, 222B) of the dependence analysis (220) described with reference to FIG. 2.

As shown, the selection analysis process traverses the called function (func1) 800 depicted in FIG. 3D and detailed in Table 1 at lines 12-20. The called function (func1) 800 includes software code having a control operation node at element 810. The control operation node at element 810 is an if/then/else node, and detailed in Table 1 at lines 16-20. The control operation node at elements 810 and 820 in FIG. 3D is entered, i.e., is selected and traversed. This decision is made because the control operation node at element 810 is calibrated to advance to element 820 when the preferred calibration is set to 0, as the corresponding Line 16 of Table 1, i.e., if (Ke_b_call!=0), indicates advancing to Line 17 in response to the calibrated value, as previously described. The related element 830 is not entered because of the selected calibration value for Ke_b_call at element 810. Element 810 is thus selected, as described with reference to executing one portion (225A, 225B) of the dependence analysis (220) described with reference to FIG. 2.

In addition, the related variables that are reported are shown, including Be_f_dat2 and Ke_b_call (430). In addition, the selection of both control and data edges is requested in the selection analysis process as described with reference to executing one portion (229A, 229B) of the dependence analysis (220) described with reference to FIG. 2 (420). In addition, scheduling nodes are ignored as described with reference to executing one portion (221A, 221B) of the dependence analysis (220) described with reference to FIG. 2 (410).

As such, there is provided a method for statically computing or otherwise determining the set of data entities that modify or use the value of a selected variable or a related variable used in software code, e.g., an embedded software program, and identifies the code paths through which the value of the selected variable is affected, including traversing a control operation node of the system dependence graph corresponding to a control statement in the software code specification using a preferred calibration state.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A computer-implemented method for evaluating a machine-executable software code specification, comprising:
   using the computer to generate a system dependence graph corresponding to the software code specification, the system dependence graph including elements comprising nodes and edges wherein the computer evaluates the system dependence graph, the evaluation of the system dependence graph comprising:
   selecting a variable modified in the software code specification;
   providing a control operation node of the system dependence graph corresponding to a control statement in the software code specification with a preferred calibration state;
   traversing to selected elements of the system dependence graph, the selected elements associated with the selected variable and the preferred calibration state of the control operation node, wherein traversing to the selected elements of the system dependence graph includes tracing the selected variable from its starting point whereat the selected variable is modified and working in a reverse analysis fashion following selected nodes and selected edges until arriving at an initial point for the selected variable;
   evaluating only the selected elements of the system dependence graph; and
   identifying ones of the selected elements whereat a state of the selected variable is modified.

2. The method of claim 1, further comprising identifying ones of the selected elements whereat a state of one of the selected variable and a related variable is modified.

3. The method of claim 1, further comprising identifying ones of the selected elements whereat the related variable is used.

4. The method of claim 1, wherein evaluating only the selected elements of the system dependence graph further comprises ignoring non-selected elements of the system dependence graph.

5. The method of claim 1, wherein traversing to selected elements of the system dependence graph, the selected elements associated with the selected variable includes executing a dependence analysis to select the selected elements.

6. The method of claim 5, wherein executing the dependence analysis to select the selected elements includes:
   identifying each element comprising an edge as one of a data edge and a control edge; and
   selecting the element comprising one of the data edge and the control edge.

7. The method of claim 5, wherein executing the dependence analysis to select the selected elements includes:
   identifying each element comprising an edge as one of a data edge and a control edge, and
   selecting the element comprising both the data edge and the control edge.

8. The method of claim 5, wherein executing the dependence analysis to select the selected elements includes:
   identifying each element comprising a node as one of a continuing node and an end node, and
   selecting the element comprising only the continuing node.

9. The method of claim 8, further comprising ignoring the element comprising the end node.

10. The method of claim 5, wherein executing the dependence analysis to select the selected elements includes:
identifying variables associated with each element comprising a node as one of a global variable and a local variable; and
selecting the element comprising the node comprising the global variable.

11. The method of claim 10, further comprising passing over the element comprising the node comprising the local variable.

12. The method of claim 5, wherein executing the dependence analysis to select the selected elements includes:
identifying an element comprising a node including a called procedure; and
selecting the element comprising the node including the called procedure only when the called procedure modifies the selected variable.

13. The method of claim 12, further comprising passing over the element comprising the node including the called procedure when the called procedure does not modify the selected variable.

14. A computer-implemented method for statically evaluating a machine-executable software code specification for an embedded system, comprising:
using the computer to generate a system dependence graph corresponding to the software code specification, the system dependence graph including elements comprising nodes and edges, wherein one of the nodes comprises a control operation node corresponding to a control statement in the software code specification;
selecting a variable modified in the software code specification;
providing the control operation node with a preferred calibration state;
traversing to selected elements of the system dependence graph, the selected elements associated with the selected variable and the preferred calibration state of the control operation node, wherein traversing to the selected elements of the system dependence graph includes tracing the selected variable from its starting point whereat the selected variable is modified and working in a reverse analysis fashion following selected nodes and selected edges until arriving at an initial point for the selected variable;
evaluating only the selected elements of the system dependence graph to identify ones of the selected elements whereat a state of the selected variable is modified; and
generating a data output indicating the identified ones of the selected elements of the system dependence graph whereat the state of the selected variable is modified.

15. The method of claim 14, further comprising identifying ones of the selected elements whereat a state of one of the selected variable and a related variable is modified.

16. The method of claim 14, further comprising identifying ones of the selected elements whereat the related variable is used.

17. The method of claim 14, wherein traversing to selected elements of the system dependence graph, the selected elements associated with the selected variable includes executing a dependence analysis to select the selected elements.

18. The method of claim 17, wherein executing the dependence analysis to select the selected elements includes:
identifying each element comprising an edge as one of a data edge and a control edge; and
selecting the element comprising one of the data edge and the control edge.

19. The method of claim 17, wherein executing the dependence analysis to select the selected elements includes:
identifying each element comprising a node as one of a continuing node and an end node; and
selecting the element comprising only the continuing node.

20. The method of claim 17, wherein executing the dependence analysis to select the selected elements includes:
identifying variables associated with each element comprising a node as one of a global variable and a local variable; and
selecting the element comprising the node comprising the global variable.

* * * * *